United States Patent [19]
Höfgen et al.

[11] 4,012,739
[45] Mar. 15, 1977

[54] INSTRUMENT LANDING SYSTEM (ILS) WITH SIMPLIFIED TRANSMITTER

[75] Inventors: Günter Höfgen; Werner Poschadel, both of Kornwestheim, Germany

[73] Assignee: International Standard Electric Corporation, New York, N.Y.

[22] Filed: Feb. 19, 1976

[21] Appl. No.: 659,409

[30] Foreign Application Priority Data
Apr. 27, 1975 Germany .......................... 2508539

[52] U.S. Cl. .............................. 343/108 R; 321/60; 343/109
[51] Int. Cl.² ...................... G01S 1/16; G01S 1/18; H02M 5/16
[58] Field of Search .......... 343/109, 108 R; 321/60

[56] References Cited
UNITED STATES PATENTS

| 2,310,202 | 2/1943 | Alford ................................ 343/109 |
| 3,887,922 | 6/1975 | Hofgen et al. ................ 343/108 R |
| 3,965,443 | 6/1976 | Towle et al. ....................... 343/109 |

Primary Examiner—Maynard R. Wilbur
Assistant Examiner—Richard E. Berger
Attorney, Agent, or Firm—William T. O'Neil

[57] ABSTRACT

An ILS (Instrument Landing System) having at least one of the Glide-slope and Localizer functions, each of said functions comprising course and clearance signals. For the course and clearance signals of either function, a single transmitter is supplied, the necessary frequency difference between those signals being obtained by dividing the transmitter output into two signals, one of which is uniquely phase modulated to produce a predetermined frequency offset with respect to the other.

6 Claims, 4 Drawing Figures

INSTRUMENT LANDING SYSTEM (ILS) WITH SIMPLIFIED TRANSMITTER

BACKGROUND OF THE INVENTION

1. Field of the Invention

The present invention relates to radio navigation generally, and more specifically, to localizer or glide-slope signal generating arrangements for the instrument-landing system of the known type.

2. Description of the Prior Art

ILS equipment has been extensively described in the prior technical literature, including the patent literature. A localizer or glide-slope facility typical of this art is described in a book by E. Kramar, "Funksysteme fur Ortung and Navigation", Verlag Berliner Union GmbH, Stuttgart 1973, on pages 193 to 205, and shown in FIG. 1, included with this description. In the aforementioned reference, it is stated that a localizer or a glide-slope facility which radiates the course and clearance signals at different frequencies requires two complete transmitters. This concept is generally accepted in the prior art.

Quite obviously, the cost of these two separate transmitters is a factor militating against the reduction of ILS system cost which has been considered important in making this instrumentation widely available for small airports.

The manner in which the present invention affords a significant reduction in cost and complexity for these systems will be understood as this description proceeds.

In accordance with the foregoing prior art description, it may be said to be the general object of the invention to reduce the amount of equipment required for ILS localizers and/or glide-slope ground facilities which radiate course and clearance signals at different frequencies.

SUMMARY OF THE INVENTION

The present invention comprises unique means whereby a single transmitter is provided for the localizer (or glide-slope) function, and the two frequencies for course and clearance signal patterns are generated from this one, transmitted by a unique frequency diversion and phase modulation scheme.

BRIEF DESCRIPTION OF THE DRAWINGS

The invention will now be explained in more detail and by way of example with reference to the accompanying drawings, in which.

DESCRIPTION OF THE PREFERRED EMBODIMENTS

Since localizers and glide-slope facilities are largely identical except for the transmitting frequencies and the antenna arrangements, it will suffice to explain the invention by making reference arbitrarily to the localizer only. For the glide-slope facility, the following description applies analogously.

Figure 1:
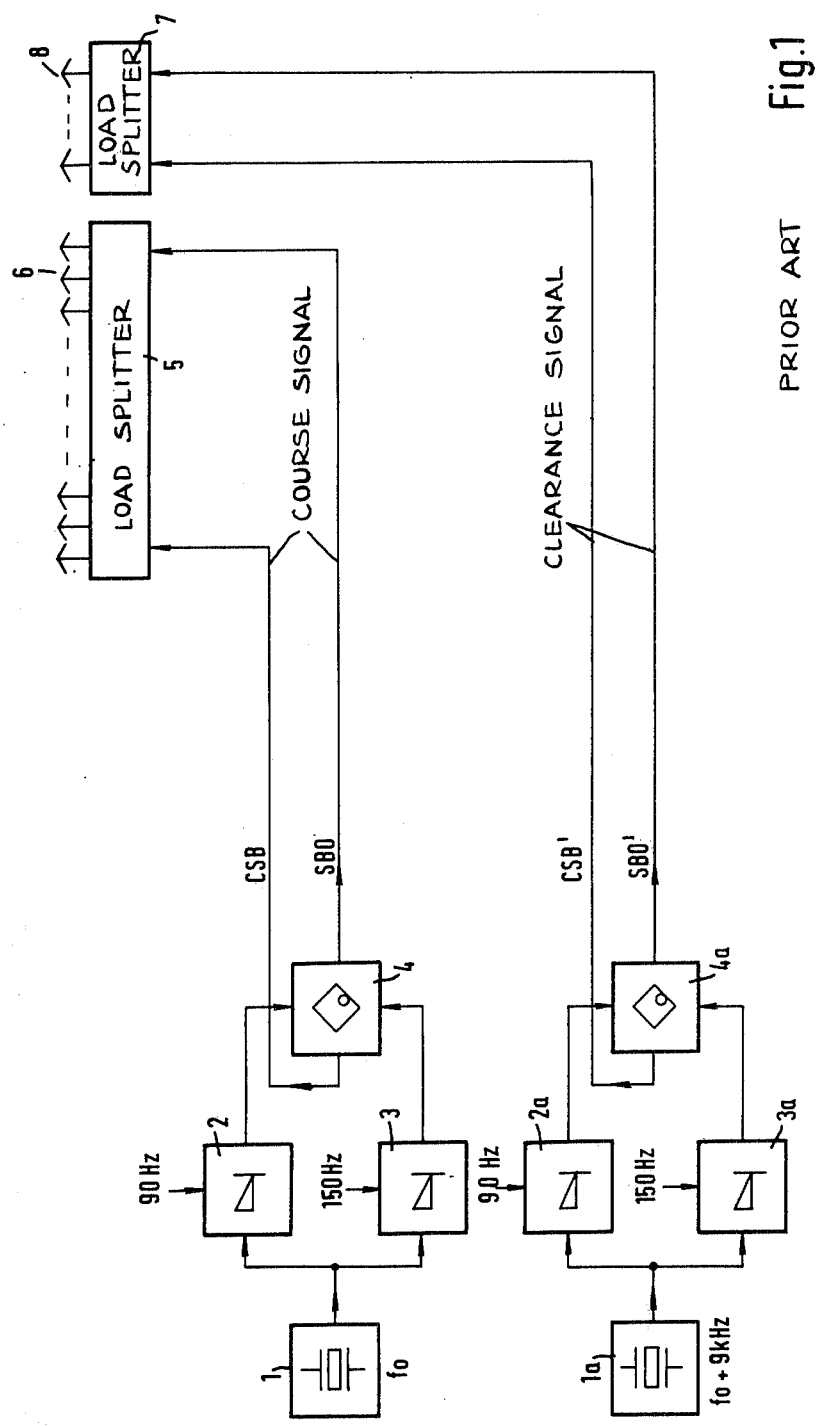
FIG. 1 is a block diagram of the above-mentioned prior art ILS transmitting facility for either the Localizer or the Glidepath function.

In two-carrier prior art systems as shown in FIG. 1, the localizer radiates a course and a clearance signal. The frequencies of the clearance signals are shifted with respect to the frequencies of the course signals by a predetermined standard 9 kHz. Therefore, these conventional localizers require two transmitters to generate the course and clearance signals, respectively.

Each of these transmitters usually consists of two crystal oscillators 1 and 1a, two transmitter stages 2 and 2a, modulated at 90 Hz, and two transmitter stages 3 and 3a, modulated at 150 Hz.

The crystal oscillators 1 and 1a generate the carrier frequencies $f_o$ and $f_o'$, respectively, (e.g., $f_o = 110$ MHz; $f_o' = 110$ MHz + 9 kHz). In the modulated transmitter stages 2, 2a and 3, 3a, these carrier frequencies are amplitude-modulated at 90 Hz and 150 Hz, respectively. The transmitter stages 2, 3 and 2a, 3a are followed by RF bridge circuits 4 and 4a, respectively. The bridge circuits 4, 4a forms the sum of and the difference between the output signals of the transmitter stages 2, 3, 2a, 3a.

At the output of the bridge circuit 4 of one transmitter, two signals CSB and SBO are present; the signal SBO consists only of the sidebands, and the signal CSB includes both carrier and sidebands. These two signals CSB and SBO are both fed to an antenna arrangement 6 through a load splitter 5 and radiated by the antenna arrangement 6 in such a manner that the course pattern is obtained, as is well known in this art.

The output of the bridge circuit 4a of the other transmitter also provides two signals CSB' and SBO', the frequencies of which are shifted with respect to the frequencies of the signals CSB and SBO by 9 kHz. The signals CBS' and SBO' are fed to an antenna arrangement 8 through a load splitter 7 and radiated by the antenna arrangement 8 in such a manner that the clearance pattern is obtained, as is also well known in this art.

Figure 2:
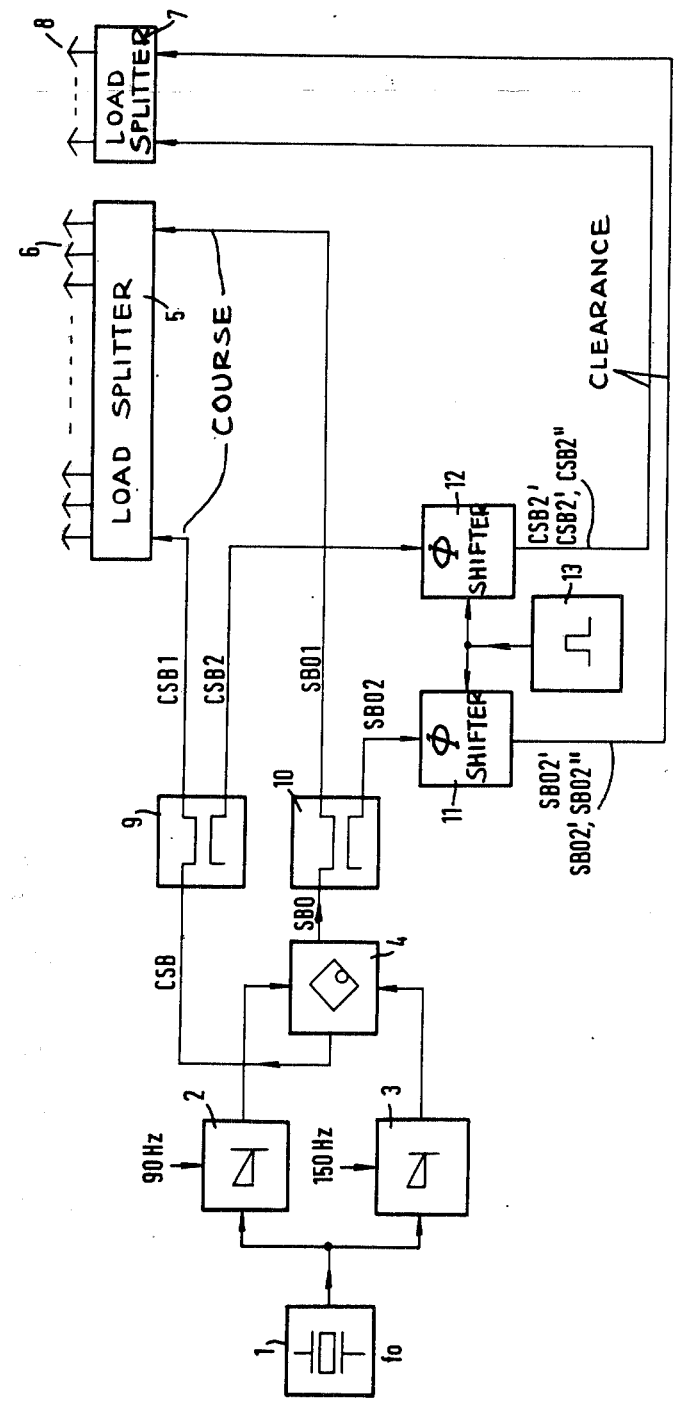
FIG. 2 is a block diagram of the ILS transmitting facility in accordance with the invention.

In the novel localizer according to the invention, as shown in FIG. 2, there is only one transmitter assembly, comprising crystal oscillator 1, 90 and 150 Hz modulators 2 and 3, respectively, and RF bridge 4.

Each of the two output signals CSB and SBO from the bridge 4 of FIG. 2 is divided, in power dividers 9 and 10, into two signal pairs CSB 1, CSB 2 and SBO 1, SBO 2, respectively. The signal pairs CSB 1 and SBO 1 are fed through the load spitter 5 to the antenna arrangement 6 and radiated as the course pattern as contemplated in FIG. 1 (this recombining signal carrier and sidebands for radiation).

The frequencies of the signals SBO 2 and CSB 2 are shifted by a fixed amount in $\phi$ shifters 11 and 12, respectively, which will be described in more detail hereinafter. The frequency shift is a linear translation, that is, it is the same for all frequencies contained in the two signals.

The frequency-shifted output signals SBO2' and CSB2' of 11 and 12 are fed to the antenna arrangement 8 through the load splitter 7 and radiated as the clearance pattern.

In the following, two embodiments of the subassemblies 11 and 12 will be described with reference to FIGS. 3 and 4.

Figure 3:
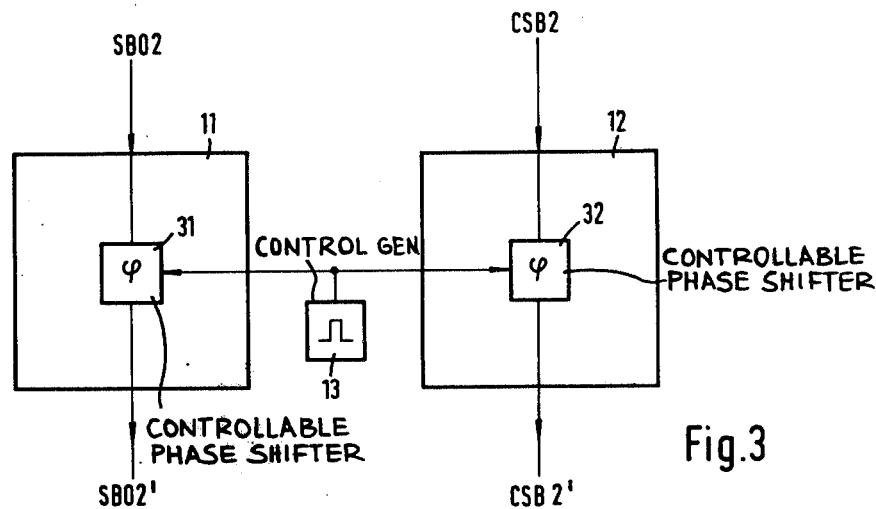
FIGS. 3 and 4 show modulation (frequency offsetting) sub-assemblies of the arrangement of FIG. 2 in greater detail.

Each of the arrangements 11 and 12 of FIG. 3 contains a controllable phase shifter 31 and 32. These controllable phase shifters in the arrangements 11 and 12 are identical and are synchronously controlled by a common control generator 13. In 31 and 32, the phases of the input signals SBO2 and CSB2 are continuously advanced step-by-step. Thus, each of 31 and 32 provides a different phase shift value for each successive pulse of 13. As a result, the frequencies of the output signals SBO2' and CSB2' are shifted with respect to the frequencies of the input signals by a fixed value. The frequency shift rate is determined by the switching sequence of the control generator 13 and by the magnitude of the phase steps.

Figure 4:
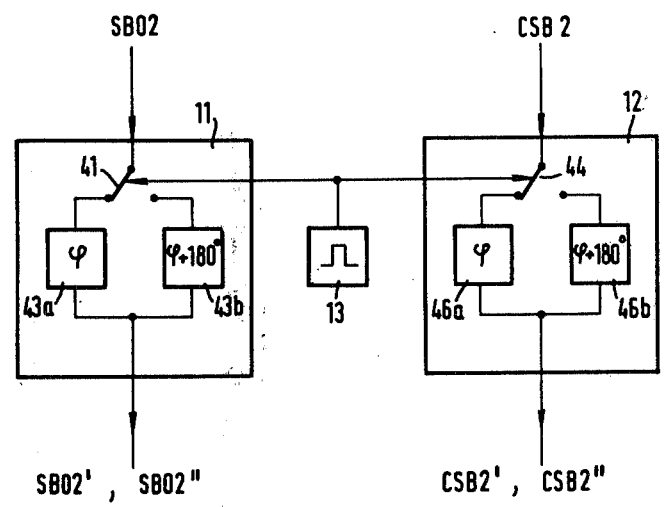

Each of the arrangements 11, 12 of FIG. 4 includes a switch 41 or 44, and two fixed phase shifters 43a/43b and 46a/46b, respectively.

It will be seen that one phase shifter, 43a, shifts the phase of the input signal SBO2 by $\phi$, and the other phase shifter, 43b, will shift the phase of the input signal SBO2 by $\phi + 180°$. The phase shifters (43a/43b) in the arrangement 11 are identical with the phase shifters (46a/46b) of the arrangement 12, and the operation is the same.

The switches 41 and 44 are preferably electronic switches controlled by a control generator 13 common to both arrangements 11 and 12 and having a unity mark-to-space ratio. Depending on the switch position, the input signal SBO2 is passed to the output of the arrangement 11 through the phase shifter 43a or alternatively through the phase shifter 43b. The input signal CSB2 is passed to the output of the arrangement 12 through the phase shifter 46a or alternatively through phase shifter 46b.

As a result of the 0°/180° frequency shift equal dwell times (unity mark-to-space ratio) synchronously affecting the input signals SBO2 and CSB2 in the arrangements 11 and 12, respectively, the applied signals are converted into upper and lower modulation sidebands SBO2', SBO2" and CSB2', CSB2" of the input signals. Thus, the signals appearing at the outputs of the arrangements 11 and 12 now differ in frequency from the input signals.

In the localizer described, the different frequencies for the course and the clearance signal thus are generated not by the two separate transmitters of the prior art, but by a single transmitter which is followed by elements 9, 10, 11, 12 for producing the necessary frequency shift as aforesaid.

What is claimed is:

1. In an instrument landing system, the combination comprising:
   means including a transmitter and modulation means for generating two initial pairs of signals, each of said initial pairs including a first signal having an RF carrier with sidebands of first and second modulation tones and a second signal comprising only said sidebands;
   phase modulation means responsive to the signals of one of said initial pairs for generating a third pair comprising carrier with sidebands and sidebands only at a predetermined frequency offset by applying a continuous phase shift at a predetermined rate of phase change to the signals of one of said initial pairs;
   and means separately responsive to said third pair and the other of said initial pairs to separately combine and radiate the two signals of said other initial pair to form a first transmittable signal corresponding to a course signal pattern and to combine and radiate the signals of said third pair to form a second transmittable signal corresponding to a clearance signal pattern.

2. In an Instrument Landing System, apparatus for generating radiatable signals at first and second carrier frequencies for defining course and clearance signal patterns in one of the system functions including Localizer and Glidepath functions, the combination comprising:
   means for generating an RF power signal at a first frequency;
   means for amplitude modulating a first fraction of said RF power signal with a 90 Hz modulation signal, and a second fraction of said RF signal with a 150 Hz modulation signal to produce corresponding first and second modulated RF signals;
   an RF bridge responsive to said first and second modulated RF signals for producing a first RF signal comprising carrier and sidebands and a second RF signal comprising only sidebands;
   power divider means responsive to each of said first and second RF signals from said RF bridge for dividing each of said carrier and sidebands signal and said sidebands only signal into first and second fractional power signal pairs, each of said pairs including a carrier and sidebands signal and a sidebands only signal;
   first means for combining a first of said fractional power signal pairs to form a transmittable signal corresponding to said course signal pattern;
   means for synchronously applying a continous phase shift to a second of said fractional power signal pairs to produce a frequency offset signal pair including carrier and sideband and sideband only signals;
   and second means for combining the signals of said offset signal pair to form a transmittable signal corresponding to said clearance signal pattern.

3. Apparatus according to claim 1 in which said modulation tones are identified as the standard Instrument Landing System modulation frequencies of 90Hz and 150 Hz.

4. Apparatus according to claim 1 in which said phase modulation means comprises a controllable discrete phase step phase shifter corresponding to each signal of said third pair of signals, and means for synchronously controlling said phase shifters to produce said third signal pair at a continuously advancing phase shift and therefore at a frequency offset with respect to said other of said initial signal pair as a function of the rate of said continuously advancing phase shift.

5. Apparatus according to claim 1 in which said phase modulation means comprises a pair of fixed phase shifters, one providing $\phi$ phase shift and the other $\phi + 180°$ phase shift for each of the signals comprising said third pair, and means are provided for synchronously switching between said $\phi$ and $\phi + 180°$ phase shifters in series with the signals of said one of said initial pairs to generate said third pair at said offset frequency.

6. Apparatus according to claim 1 in which said means to separately combine and radiate said signals of said third pair and said other initial pair comprises load splitter circuits and antenna means, respectively.

* * * * *